United States Patent [19]

Lee et al.

[11] 4,084,438

[45] Apr. 18, 1978

[54] CAPACITIVE PRESSURE SENSING DEVICE

[75] Inventors: Shih-Ying Lee, Lincoln; Dennis K. Briefer, Berlin, both of Mass.

[73] Assignee: Setra Systems, Inc., Natick, Mass.

[21] Appl. No.: 671,612

[22] Filed: Mar. 29, 1976

[51] Int. Cl.² ............................................... G01L 9/12
[52] U.S. Cl. ........................................ 73/706; 73/716
[58] Field of Search .................... 73/398 C, 395, 393; 317/245, 246

[56] References Cited

U.S. PATENT DOCUMENTS

| | | | |
|---|---|---|---|
| 1,559,063 | 10/1925 | Becker | 73/393 |
| 2,649,579 | 8/1953 | Alexander | 317/246 |
| 3,040,582 | 6/1962 | Lorenz | 73/393 |
| 3,356,963 | 12/1967 | Buck | 73/398 C |
| 3,405,559 | 10/1968 | Moffatt | 73/398 C |
| 3,643,510 | 2/1972 | Lissau | 73/393 |
| 3,645,137 | 2/1972 | Hazen | 73/398 C |
| 3,715,638 | 2/1973 | Polye | 317/246 |
| 3,858,097 | 12/1974 | Polye | 73/398 C |

FOREIGN PATENT DOCUMENTS 2,021,479  11/1971  Germany ........................ 73/398 C

*Primary Examiner*—Anthony V. Ciarlante
*Attorney, Agent, or Firm*—Kenway & Jenney

[57] ABSTRACT

A pressure sensing device and method of construction therefor. The device includes at least two dielectric discs which are fused together at their peripheral boundary to form a hollow monolithic capsule having two nominally planar opposed inner surfaces. The opposed inner surfaces of the capsule are mutually separated by a uniform gap near the peripheral boundary and by a distance related to the difference in pressure interior and exterior to the capsule otherwise. Conductive films are disposed on opposed portions of the inner surfaces of the capsule. The device further includes a means for electrically coupling each of the conductive films to an associated terminal exterior to the capsule. The capacitance between these terminals is related to the above-mentioned pressure differential.

33 Claims, 16 Drawing Figures

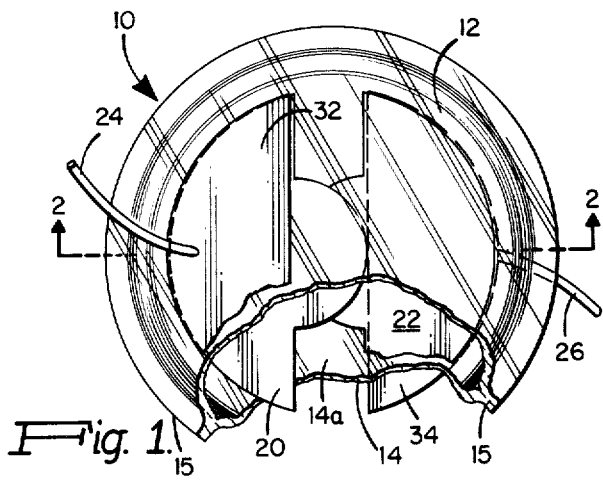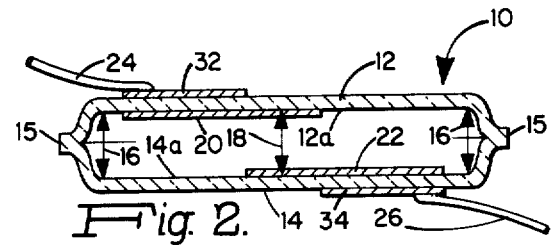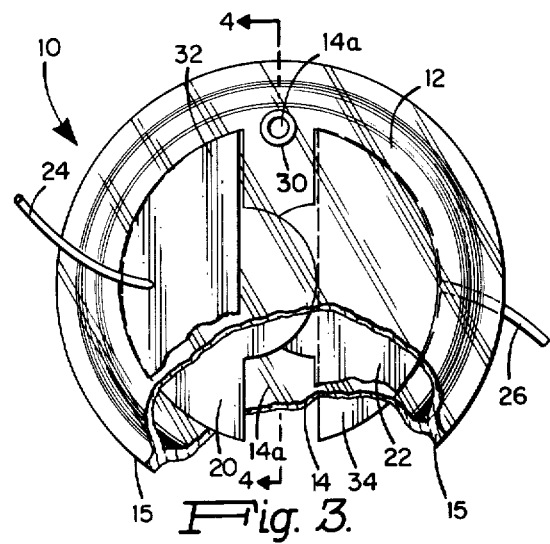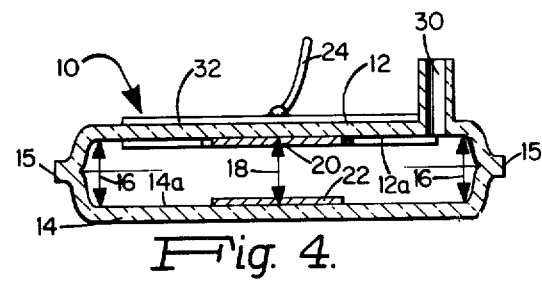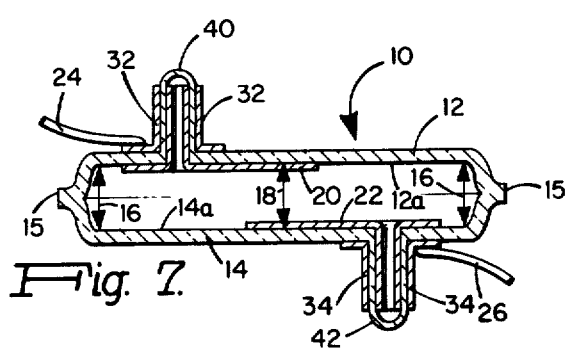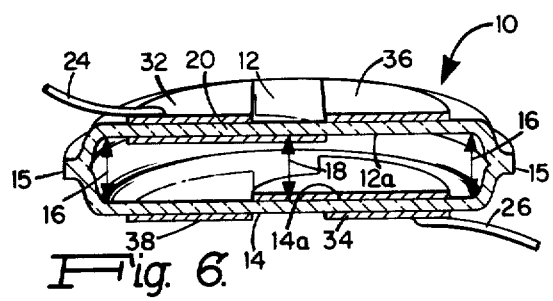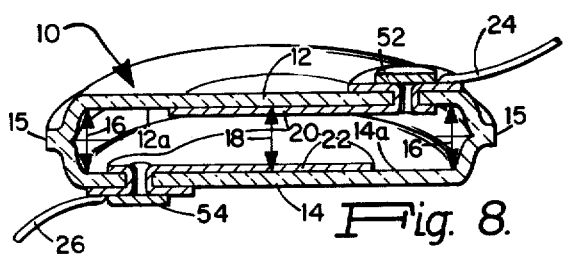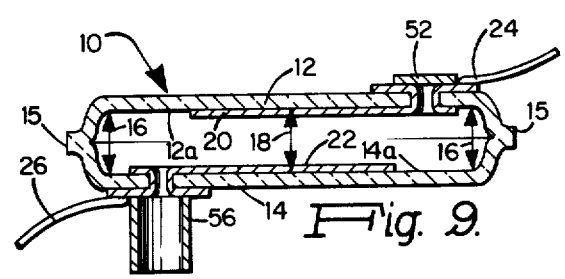

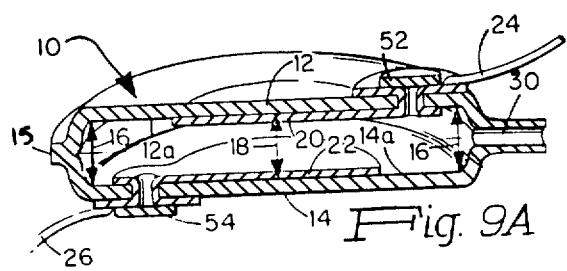

CAPACITIVE PRESSURE SENSING DEVICE

BACKGROUND OF THE INVENTION

This invention relates to pressure sensing instrumentation, and more particularly to capacitive pressure sensing devices.

There are many forms of pressure sensing instrumentation in the prior art which utilize capacitive sensors. Typically, the sensor in such instrumentation includes a metal housing with metallic diaphragms. The accuracy of these types of instruments is limited by the sensor material, particularly since metals are far from a perfect elastic material, and the characteristic time and stress-dependent memory causes hysteresis and slow drift. Further, metal has relatively high thermal expansion coefficient which in turn causes the instrument to be effected by temperature variation.

Due to such shortcomings in metallic sensors, sensors have been constructed using dielectric capsules with conductive films on the interior surfaces. A typically used dielectric material is quartz, which is characterized by a very low thermal expansion coefficient and near perfect elastic property. Although in theory, quartz could be used to make an ideal pressure sensor, there are many practical considerations which have prevented extensive use of such sensors, notably, high fabrication cost. Typically, prior art dielectric sensors utilize a pair of pre-shaped, cup-like dielectric elements which are joined together, using a suitable sealing material, to form a gas-tight capsule. In other forms, a pair of disc-like dielectric elements are joined together at their peripheral boundary by a bead of sealing material. The sealing material usually is selected to match the thermal-expansion coefficient of the electrical feedthrough material. This material is some form of metal alloy and generally has much higher thermal-expansion coefficient and worse elastic properties than that of the dielectric material. The resultant capsule is therefore made of a composite of materials which are generally inferior than a more homogeneous construction from the thermal stability viewpoint. To reduce the influence of the sealing material, preshaped dielectric elements have been used, although at a greatly increased fabrication cost. Other prior art shows monolithic fused dielectric capsules with metal wire feed-through to make contact with metal film inside the capsule. Since no known metal can match the low coefficient of expansion of otherwise suitable dielectric materials such as quartz, this latter type of construction is impractical due to the non-reliability of the metal-dielectric seal. Furthermore, even satisfactory metal-quartz seals are extremely susceptible to leak or degradation upon subjection to a high temperature (above 2000° F) such as may be required in an annealing process used to reduce internal stress build-up in the fusion process.

Prior art sensors formed from a pair of disc-like dielectric elements joined together at their peripheral boundary by a head of sealing material have been configured as differential pressure sensors by configuring a tubular pressure coupling member through the sealing material so that a reference pressure may be coupled to the capsule interior. However, such configurations have been limited to use in a very narrow temperature range since the sealing material used must accommodate expansion and contraction of both the dielectric elements and the pressure coupling member, while affording a gas-tight seal over a desired operational temperature range.

Even though dielectric materials such as quartz are characterized by a relatively low coefficient of thermal expansion, in certain applications where extremely accurate sensors are required, the temperature dependencies of prior art dielectric capsule sensors cause unacceptably high measurement error. Two principal sources of this error are:

(1) the relatively high thermal expansion rate of the conductive film, and
(2) the thermal coefficient of the modulus of elasticity of the dielectric material.

A further disadvantage of the prior art sensors is their limitation of use to non-corrosive or electrically non-conductive media in order that the media not interact with the electrical connections to the sensors.

Accordingly, it is an object of the present invention to provide a high accuracy capacitive pressure sensing device characterized by a relatively high reliability and low cost.

Another object is to provide a high accuracy capacitive pressure sensing device which is substantially independent of temperature over a relatively broad range of operating temperature.

Still another object is to provide a high accuracy pressure sensing device which is suitable for use in a corrosive or electrically conductive media.

SUMMARY OF THE INVENTION

In accordance with the present invention, a pair of dielectric disc elements, each having at least one planar surface peripherally bounded by a predetermined curve, are fused together at their peripheral boundary in a manner forming a hollow, monolithic capsule having two nominally parallel opposed under surfaces. Such a capsule may be formed by initially positioning the disc elements so that the planar surfaces are opposite each other and mutually separated by a predetermined gap, with the gap being established by a plurality of shims. With the discs in this configuration, a relatively small plurality of spaced points along the peripheral boundary of the discs are pressed together and fused by applying heat and pressure at localized regions near those spaced points. Then the shims are removed and the remaining points on the peripheral boundary are similarly fused by the application of heat and pressure at localized regions of the disc elements near the remaining peripheral points. In order to reduce internal stress developed during the fusion process, the capsule may then be annealed at temperatures in excess of 2000° F. As a result, a relatively low cost monolithic capsule having substantially parallel inner surfaces may be formed rapidly and efficiently and with a high degree of reproducibility from unit to unit.

According to the present invention, each of the inner surfaces of the capsule includes a deposited conductive film with at least a portion of the conductive films being disposed on opposing portions of the inner surfaces. With this structure, the inner surfaces of the capsule are separated by a uniform, predetermined gap near their peripheral boundary, as established by the fused portion of the structure. However, away from that boundary, the inner surfaces are separated by a distance related to the difference in pressure exterior and interior to the capsule due to the pressure-caused deflection of the capsule walls. Since the overlapping portion of the two films may be characterized by a capacitance which may be approximated by the formula:

$$\epsilon A/d$$

(where $\epsilon$ is the dielectric coefficient of the medium within the capsule, A is the area overlapping portions of the two films, and $d$ is the separation of the films), the capacitance exhibited by the two films provides a measure of the pressure differential existing across the capsule walls.

In forms of the invention with the capsule completely enclosing a region, and wherein that interior region is evacuated, the capsule may be utilized with a suitable electrical coupling means as an absolute pressure sensing device. Alternatively, a pneumatic coupling means may be used to couple a reference pressure to the interior of the capsule. According to one aspect of the present invention, such a pneumatic coupling means may comprise a tubular member fused within or about a channel, or hole, in one of the disc elements. Alternatively, a tubular member may be fused between the disc elements at the capsule periphery. In each of these configurations, a monolithic structure is formed wherein the interior region of the capsule adjoins the interior region of this tubular member, and a reference pressure may be coupled by way of the tubular member to the interior of the capsule, in conjunction with a suitable electrical coupling means, to form a differential pressure sensing device.

In capacitive pressure sensing devices comprising a monolithic, dielectric capsule having conductive films on opposing portions of the capsule inner surfaces, the thermal expansion rate of the conductive coating and thermal coefficient of the dielectric modulus of elasticity (which in itself may vary as much as 1% per 100° F) may produce unacceptably high error. For example, in a capsule configured in accordance with the present invention for use as a barometric sensor, where the capsule is always under compressive stress, the change in distance per 100° F between the capsule inner surfaces due to temperature at a predetermined barometric pressure, may be as high as 3% of full scale.

According to another aspect of the present invention, this temperature variation may be offset through the use of a mechanical temperature compensator. The temperature compensator comprises at least one bimetallic element configured to apply temperature dependent forces to the outer surfaces of the capsule, wherein the temperature dependent forces produced by the bimetallic elements substantially offset the otherwise present temperature dependent deformations in the disc elements. That is, the temperature dependency of the compensator-produced forces substantially matches the temperature dependency of the distance between the capsule opposed inner surfaces over a predetermined range. As a result, this distance is substantially a single-valued function of the difference pressure interior and exterior to the capsule over the temperature range.

In the various forms of the present invention, the electrical coupling means may comprise a feedthrough capacitive coupler including a conductive film on the exterior surface of the capsule opposing a portion of the conductive film on the interior surface of each disc element. In this form, the two outer planar surfaces of the capsule may be substantially parallel with the inner planar surfaces. The overlapping portions of the conductive films on each disc element establish a capacitive coupling to the capacitor formed by the opposed portions of the conductive films on the inner surfaces of the capsule. The films on the inner surfaces may for example, include a relatively small overlapping area near the center, or most pressure sensitive region of the capsule, while the film on the outer surface of the capacitor may have a relatively large area overlapped with the corresponding portion of the film on that disc element. In this manner, the overlapping portion of the inner films establish a relatively high pressure sensitive capacitor while the overlapping of the outer film with one of the inner films provides a relatively high capacitive coupling between the sensing portions of the inner films and the terminal elements.

This feedthrough capacitive coupler may be enhanced by providing a relatively thin wall extension member to one or both of the disc elements, with the extension member having sidewalls thinner than those associated with the disc elements, and extending outwardly from the capsule. The conductive films on the inner planar surface are extended continuously to the inner surface of the extension member while the conductive film on the outer surface is extended continuously to the outer portion of the extension member. As a result, the effective coupling capacitance is increased by an additional factor related to the separation of the films disposed on the extension member.

In still another form of the invention, the capsule may include a hole passing through each of the disc elements and forming a channel from the interior to the exterior of the capsule. The conductive films on the inner surfaces of the capsule extend continuously from the inner surfaces to the channel surfaces and to a portion of the respective outer surfaces of the capsule, where the films are maintained in relatively good electrical contact with a respective one of the terminals. In this form of the invention, the capsule further includes a cover for overlaying at least one of these channels, with the cover being affixed to the outer surface of the capsule and forming a gas-tight seal between the region exterior to the capsule and the region interior to the capsule. This seal and cover may be established by a relatively ductile, fused metal plug affixed to the conductive film at the channel. In an absolute pressure transducer, with the capsule interior evacuated, the channels in both disc elements of the capsule may be sealed in this manner.

Alternatively, in a differential transducer configuration, only one of the channels may so be sealed while the other channel is joined with a tubular element extending to a means for establishing a reference pressure in the interior portion of the capsule.

In accordance with another aspect of this invention in the configurations having the channels passing through the disc elements, those channels may be located near portions of the disc elements characterized by a relatively low stress, i.e. near portions characterized by stress points of inflection.

In accordance with still another aspect of this invention, a device suitable for sensing pressure in a corrosive or electrically conductive medium comprises three dielectric disc elements fused together at their peripheral boundary to form a monolithic capsule having two interior chambers, each chamber being bounded by two of the disc elements. A first of the chambers includes nominally planar opposed inner surfaces which are mutually separated by a uniform predetermined gap near the peripheral boundary and by a distance related to the difference in pressure in the two chambers otherwise. The first chamber includes inner conductive films on opposed portions of its inner surfaces. The two chamber capsule also includes a means for electrically coupling these inner conductive film members to associated terminals exterior to the capsule.

The capsule further includes a means for coupling an external medium to the second chamber in a manner such that the electrical coupler is isolated from the external medium. This medium coupler may take the form of a tubular member passing through and fused to the outer disc forming the second chamber. In this configuration, the external medium is applied directly to the interior of the second chamber. The pressure differential across the disc element separating the first and second chambers causes a displacement of the central portion of that disc element with respect to the film member on the opposite inner surface of the first chamber, thereby providing at the two terminals a characteristic capacitance which is a measure of the pressure differential between the two chambers. Since the external medium is confined to the second chamber and medium coupler, the electrical coupler is unaffected by any corrosive or electrical conduction characteristics of that medium.

BRIEF DESCRIPTION OF THE DRAWINGS

The foregoing and other objects of this invention, the various features thereof, as well as the invention itself, may be more fully understood from the following description, when read together with the accompanying drawings in which:

FIGS. 1-2, 3-4, 5-9, and 9A show capacitive pressure sensing devices in accordance with the present invention.

DESCRIPTION OF THE PREFERRED EMBODIMENT

Figure 10:
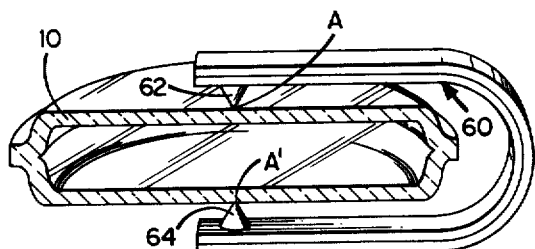
FIGS. 10-12 show capacitive pressure sensing devices having a mechanical temperature compensator in accordance with the present invention.

FIGS. 1 and 2 illustrate one embodiment of the present invention wherein a sensing device comprises a hollow, monolithic, dielectric capsule 10 having nominally planar opposed inner surfaces 12a and 14a which are separated from each other by a uniform, predetermined gap 16 near the peripheral boundary 15 of the capsule 10. The inner surfaces 12a and 14a include thin, electrically conductive films 20 and 22, respectively. The capsule 10 is formed by a pair of circular flat disc elements 12 and 14 which have been fused together near their peripheral boundary. While disc elements 12 and 14 are characterized by substantialy uniform thickness for the illustrated embodiment, other embodiments may include disc elements having a non-uniform thickness. Furthermore, the disc elements 12 and 14 may alternatively be thin, spherical shell sections having complementary nominally planar surfaces, i.e. characterized by a relatively large and substantially identical radii of curvature, rather than perfectly flat discs.

The surfaces 12a and 14a are separated by a gap 18 at a central location in the capsule which is a function of the pressure differential interior and exterior to the capsule 10 and the elastic properties of the disc elements 12 and 14. By way of example, the disc elements may be quartz, glass or ceramic.

The capsule further includes a feedthrough capacitive coupling means for electrically coupling the capacitor (formed by the overlapping portions of films 20 and 22) to the exterior terminals 24 and 26. In this embodiment, the capsule 10 includes conductive films 32 and 34 on the outer surfaces of disc elements 12 and 14, respectively. The films 32 and 34 overlap portions of the films 20 and 22, respectively, of the inner surfaces of capsule 10. In the illustrated embodiment, the overlap area of films 32 and 20 and the overlap area of films 34 and 22 are relatively large compared with the overlap area of films 20 and 22. The relatively large capacitance which characterizes the overlap area of films 32 and 20, and films 34 and 22 thereby provide correspondingly large capacitive coupling of the capacitance associated with the overlapping portions of films 20 and 22 to the terminals 24 and 26. The overlapping portions of films 20 and 22 are located centrally in the capsule 10 (i.e. they are separated by gap 18 as illustrated in FIG. 6) in a manner to maximize the sensitivity of the sensor capsule 10 to pressure-caused deformation of the capsule walls.

In operation, the sensor of FIGS. 1 and 2 may be used in a well-known capacitive bridge pressure sensing apparatus. In such a configuration, the pressure difference between the exterior and interior of the capsule 10 is effective to deform the disc elements 12 and 14 in a manner such that the gap 18 is less than the gap 16 when the pressure outside the capsule exceeds that inside the capsule and the gap 18 exceeds the gap 16 when the pressure outside the capsule is less than the pressure inside the capsule. As a result, the conductive films 20 and 22 may be characterized by a capacitance which varies with the pressure differential. As shown in FIGS. 1 and 2, the capsule 10 completely encloses its interior volume, and when the interior is evacuated, the capacitance between the conductive members 24 and 26 is proportional to the pressure exterior to the capsule, with the capsule sensor thereby acting as an absolute pressure sensor.

FIGS. 3 and 4 illustrate an alternative embodiment suitable for use as a differential pressure sensor. In those figures, and subsequent FIGS. 5-12, elements corresponding to those in the embodiments of FIGS. 1 and 2 are identified with identical reference numerals. As shown in FIGS. 3 and 4, a tubular member 30 extends through and is fused to the disc element 12 forming a monolithic structure in a manner so that the region interior to the tubular member 30 adjoins the interior region of the capsule 10. In this configuration, a suitable pressure reservoir may be connected to the tubular member 30 so that the interior of the capsule 10 may be maintained at a desired pressure. As a result, the gap 18 varies as a function of the difference in pressure exterior and interior to the capsule, with the capsule acting as a differential pressure transducer. In other respects, the operation of the embodiment in FIGS. 3 and 4 is similar to that of the embodiment of FIGS. 1 and 2.

FIG. 5 illustrates a cross-sectional view of a variation of the embodiment of FIGS. 3 and 4 wherein the tubular member 30 is fused to the elements 12 and 14 along the capsule rim rather than through disc element 12. This embodiment is less sensitive to error which might be produced from acceleration of the capsule compared to the embodiment of FIGS. 3 and 4.

FIG. 6 illustrates a cross-sectional view of a variation of the embodiment of FIGS. 1 and 2. In this embodiment, two additional conductive films 36 and 38 are disposed on portions of the outer surfaces of capsule 10 opposite films 34 and 36. In operation, films 36 and 38 may be grounded in order to reduce the effect of fringing fields.

FIG. 7 illustrates a cross-sectional view of another variation of the embodiment illustrated in FIGS. 1 and 2. The capsule of FIG. 7 includes hollow extension members 40 and 42 which are fused to and extend outwardly from the disc elements 12 and 14, respectively. The sidewalls of the extension members 40 and 42 are relatively thin compared with the thickness of the disc elements 12 and 14 and it will be understood that the films 20 and 32 extend continuously from the surfaces of disc element 12 to and including the respective interior and exterior sidewalls of the extension member 40. As a result, the coupling capacitance which characterizes the overlapped portions of films 20 and 32 is relatively large compared with the corresponding capacitance in the embodiment of FIGS. 5 and 6 due to the smaller effective separation between the plates of the capacitor. The films 22 and 34 extend continuously in a similar manner to the sidewalls of the relatively thin-walled extension member 42 to provide a similarly increased capacitive coupling coefficient to the terminal 26. This embodiment is particularly effective when the pressure exterior to the capsule exceeds the interior pressure. In other embodiments, one of the extension members 40 may be used to provide the pneumatic coupling means to a reference pressure source for establishing a reference pressure on the interior of capsule 10.

FIG. 8 illustrates a cross-sectional view of still another embodiment of the present invention. In this embodiment, the capsule 10 includes a channel passing through each of the disc elements 12 and 14. The conductive films 20 and 22 extend continuously from the respective surfaces 12a and 14a along the interior surfaces of the respective channels and to a portion of the exterior surface of the respective disc elements 12 and 14. Such a conductive film may be thermally deposited platinum.

Terminals 24 and 26 are respectively joined directly to portions of films 20 and 22 exterior to the capsule 10, e.g. by way of fused metal.

Electrically conductive cover members 52 and 54 are joined to the respective portions of films 20 and 22 which are exterior to the capsule 10 to form a gas-tight seal to the region interior to the capsule. The cover members 52 and 54 may take the form of a fused metal plug or alternatively may be separate conductive or dielectric plates affixed to the extensions of the conductive films.

As shown in FIG. 9, in alternative embodiments which are similar to the embodiment of FIG. 8, one of the cover members may provide the pneumatic coupling for the interior of the capsule 10 to the reference pressure source to provide a differential pressure sensor. The cover member 56 in this case may take the form of a tube joined to the portion of film 22 or 20 extending through the channel in the respective disc element. In the embodiment of FIG. 8, the channels in discs 12 and 14 are located near points of minimum stress, i.e. at stress inflection points between regions of compression stress and regions of tension stress.

FIG. 9A shows another embodiment which is similar to that shown in FIG. 8 but wherein a pneumatic coupling for the interior of the capsule 10 to the reference pressure source is provided by a tubular member 30 fused to the capsule 10 at its peripheral boundary.

Figure 11:
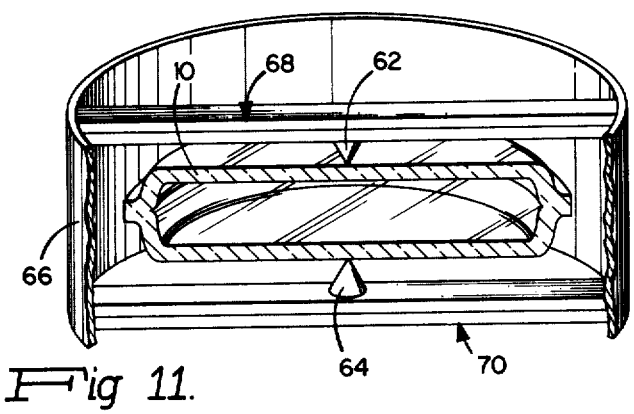
Figure 12:
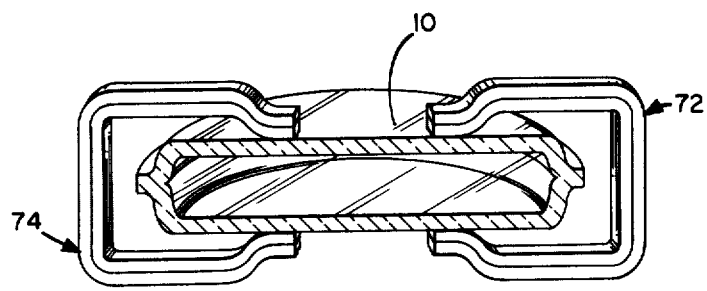

FIGS. 10–12 illustrate cross-sectional views of exemplary configurations of a sensing device including a dielectric capsule and a mechanical temperature compensator. The illustrated capsule may have the form of any of the above-described capacitive sensing devices. Furthermore, the temperature compensator may alternatively be used in conjunction with prior art sensors comprising a monolithic dielectric capsule having conductive films on opposing portions of the capsule inner surfaces. In FIGS. 10–12, the inner conductive films and the electrical coupling means are not shown since any of the above-described film configurations and electrical coupling means may be utilized, as well as certain ones from the prior art, in keeping with this aspect of the present invention.

FIG. 10 shows a single hair-pin shaped bimetallic element 60 attached to the center of capsule 10 at points A and A' by contact pads 62 and 64, respectively. The geometric proportion of the bimetallic element 60 is predetermined to match the capsule characteristics so that the temperature dependent force applied by element 60 to the outer surfaces of capsule 10 substantially offset any temperature induced movement of points A and A' which would otherwise be present. The bimetallic element is further configured so that the contact pads are in compressive contact with the capsule outer surfaces over the entire range of operational temperature.

FIG. 11 shows an embodiment wherein a dielectric capsule 10 is enclosed within a generally cylindrical structure having thin metallic sidewalls 66 and bimetallic top and bottom elements 68 and 70, respectively. The elements 68 and 70 are connected to capsule 10 by contact pads 62 and 64.

FIG. 12 shows an embodiment having a pair of bimetallic elements 72 and 74. Elements 72 and 74 are connected by fused metal or relatively resilient cement to capsule 10 near stress inflection points of the disc elements forming that capsule. By positioning the junctions of elements 72 and 74 with capsule 10 near the inflection points, friction and hysteresis effects are minimized.

Figure 13:
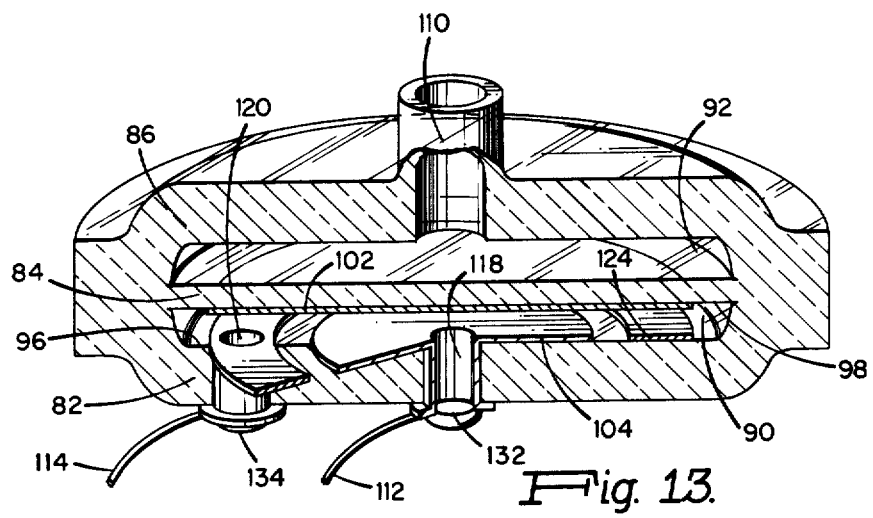
FIGS. 13-15 show alternative embodiments of the present invention suitable for use in corrosive or electrically conductive media.

FIG. 13 shows an embodiment suitable for measuring the absolute pressure of a corrosive or electrically conductive medium. The pressure sensing device comprises a capsule 80 formed by three circular dielectric disc elements 82, 84 and 86, which are fused together at their peripheral boundary to form a monolithic, two chamber structure. The capsule includes a first interior chamber 90 bounded by disc elements 82 and 84, and a second interior chamber 92 bounded by disc elements 84 and 86. The opposed inner surfaces 96 and 98 of chamber 90 are nominally planar and include conductive films 102 and 104, respectively, on mutually opposed portions.

The opposed inner surfaces 96 and 98 of the disc elements 82 and 84 are mutually separated at their peripheral boundary by a uniform predetermined gap and separated otherwise by a distance related to the difference in pressure in chambers 90 and 92. In the illustrated embodiment, the disc 84 is relatively thin compared with discs 82 and 86 so that the distance between discs 82 and 86 is relatively fixed while the distance between discs 84 and 82 (away from their peripheral boundary) varies with the pressure differential across disc 84.

A tubular member 110 passes through and is fused to disc 86 such that the interior region of chamber 92 adjoins the interior region of the tube 110. With this tube 110, an external medium may be coupled directly to the interior of chamber 92 such that the pressure associated with that medium is applied against the surface of disc 84 which bounds chamber 92. This pressure, which in turn has an opposing pressure applied on disc 84, is opposed by the pressure associated with the interior of chamber 90 as applied to the surface 98 of disc 84. The difference in pressure in chambers 90 and 92 causes a deformation of the disc 84, thereby controlling the separation of the conductive films 102 and 104. The capacitance associated with the conductive films 102 and 104 is substantially inversely proportional to the separation of those films.

The embodiment of FIG. 13 includes means for electrically coupling films 102 and 104 to external terminals 112 and 114, respectively, so that the characteristic capacitance of the film configuration may be utilized as a measure of the pressure difference between the chambers 92 and 90. In this configuration, the restriction of the external medium to the region interior to tube 110 and to the interior of chamber 92, permits operation in an electrically conductive or corrosive medium which otherwise would degrade the electrical coupling to terminals 112 and 114.

In the embodiment of FIG. 13, disc 82 includes channels 118 and 120 passing therethrough. The conductive film 104 extends continuously from the inner surface of chamber 90 through the surface of channel 118 and to a portion of the outer surface of capsule 80. Chamber 90 further includes a coupling film on a portion of the surface of the disc 82 which opposes a portion of film 102. In this embodiment, film 104 is substantially circular and located centrally on disc 82 and film 124 is substantially annular and located near the periphery of disc 82. The coupling film 124 extends from the inner surface of capsule 90 to the surface of channel 120 and to a portion of the outer surface of capsule 80. The portions of films 104 and 124 on the outer surface of capsule 80 are directly connected to respective ones of terminals 112 and 114. As shown, the channels 118 and 120 include cover members 132 and 134, respectively, affixed thereto in a manner providing a gas-tight seal between the interior region of the respective channels and the region external to the capsule 80. The cover members 132 and 134 may be dielectric materials or conductive materials, such as fused metal. With this configuration and the interior of chamber 90 evacuated, the capacitance at terminals 112 and 114 provides a measure of the absolute pressure in the chamber 92.

Figure 14:
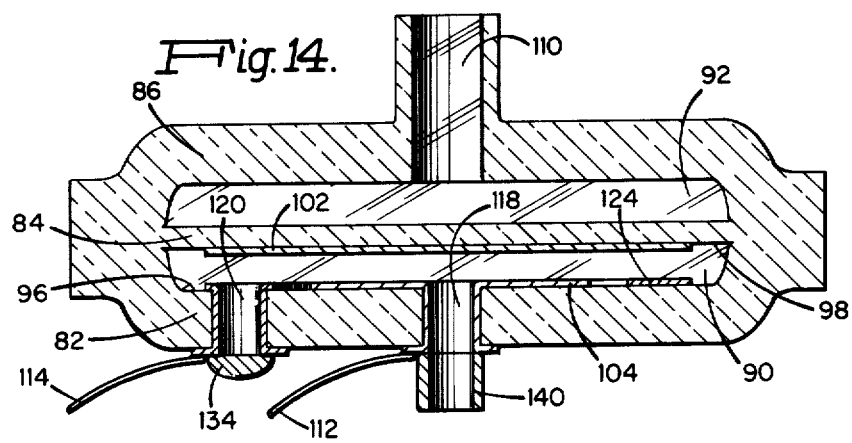

FIG. 14 illustrates an embodiment substantially similar to that of FIG. 13, (and corresponding elements are denoted with identical reference numerals) but wherein the cover member 132 is replaced with a tubular member 140 which is affixed to the portion of film 104 exterior to capsule 80. This tubular member may be used to couple a reference pressure to the interior of chamber 90 so that the capacitance at terminals 112 and 114 provides a measure of the pressure difference between the reference pressure and that of the external medium, as applied to the interior of chamber 92.

Figure 15:
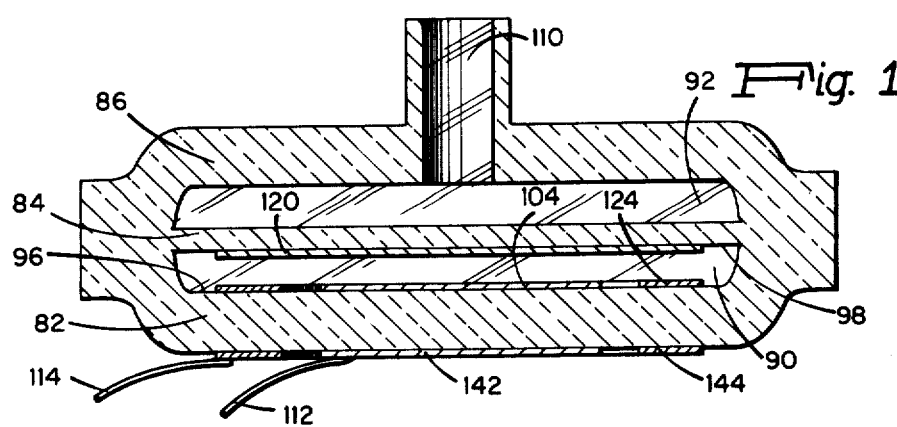

FIG. 15 illustrates a further embodiment which is substantially similar to that illustrated in FIGS. 13 and 14, except for the electrical coupling means. In FIG. 15, the disc 82 includes outer conductive film members 142 and 144, respectively overlying film members 104 and 124. The outer film members 142 and 144 are connected directly to terminals 112 and 114, respectively. In this configuration, the capacitance between the films 104 and 102 and the capacitance between films 144 and 124 and between the films 124 and 102 effectively couple the films 102 and 104 to terminals 112 and 114. In further embodiments related to that illustrated in FIG. 15, a tubular member similar to member 140 may be coupled to the interior region of chamber 90 in order to provide a differential pressure sensor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A pressure sensing device comprising:
   A. a pair of dielectric disc elements, each having at least one nominally planar surface peripherally bounded by a predetermined curve, said disc elements being fused together at their peripheral boundary to form a hollow monolithic capsule having nominally planar opposed inner surfaces, wherein said opposed inner planar surfaces are mutually separated by a uniform, predetermined gap near said peripheral boundary and by a distance related to the difference in pressure exterior and interior to said capsule otherwise, and wherein said capsule includes inner conductive film members disposed on opposed portions of said opposed inner surfaces, and
   B. coupling means for electrically coupling said inner film members to conductive terminal elements exterior to said capsule, wherein the outer surface of said capsule has an outer conductive film member disposed on a portion thereof opposite each inner conductive film member, each of said outer conductive film members being in good electrical contact with one of said terminal elements.

2. A device according to claim 1 wherein said capsule has two nominally planar outer surfaces, said outer surfaces being substantially parallel to said opposed inner surfaces, and underlying a respective one of said outer film members.

3. A device according to claim 1 wherein at least one of said disc elements includes a hollow extension member extending outwardly from said capsule, said extension member being fused to said disc element whereby the interior region of said capsule adjoins the interior region of said extension member, and wherein further said inner and outer conductive film members on said disc element extend continuously from the respective inner and outer surfaces to opposed portions of the inner and outer surface of the sidewalls of said extension member.

4. A device according to claim 3 wherein said extension member is closed at one end whereby said capsule and extension member completely enclose the region interior thereto.

5. A device according to claim 3 whereby said capsule and extension member form a monolithic structure.

6. A device according to claim 4 wherein the area of the opposed portion of said inner conductive film members is relatively small compared with the area of the opposed portions of said inner and outer conductive film members on each disc element.

7. A device according to claim 1 further including a pneumatic coupling means for coupling a reference pressure to the interior of said capsule.

8. A device according to claim 7 wherein said pneumatic coupling means comprises a tubular member fused to one of said disc elements whereby the interior region of said capsule adjoins the interior region of said tubular member.

9. A device according to claim 8 wherein said tubular member and said capsule form a monolithic structure.

10. A device according to claim 7 wherein said pneumatic coupling means comprises a tubular member fused to said capsule at said peripheral boundary whereby the interior region of said capsule adjoins the interior region of said tubular member, said tubular member and said capsule forming a monolithic structure.

11. A device according to claim 1 further comprising a mechanical temperature compensator having a bimetallic compensating means for applying temperature dependent forces to the outer surfaces of said capsule, wherein the temperature dependency of said forces substantially matches the temperature dependency of the distance between said opposed inner surfaces over a predetermined temperature range, whereby said distance is substantially a single-valued function of said difference in pressure over said predetermined temperature range.

12. A pressure sensing device comprising:
A. a pair of dielectric disc elements, each having at least one nominally planar surface peripherally bounded by a predetermined curve, said disc elements being fused together at their peripheral boundary to form a hollow monolithic capsule having nominally planar opposed inner surfaces, wherein said opposed inner surfaces are mutually separated by a uniform, predetermined gap near said peripheral boundary and by a distance related to the difference in pressure exterior and interior to said capsule otherwise, and wherein said capsule includes inner conductive film members disposed on opposed portions of said opposed inner surfaces, and
B. coupling means for electrically coupling said inner film members to conductive terminal elements exterior to said capsule,
wherein said capsule includes a channel passing through each of said disc elements,
wherein said inner conductive film members extend continuously from the respective opposed inner surfaces to the inner surface of said channel and to a portion of the outer surface of said capsule, and are in relatively good electrical contact with a respective one of said terminal elements, and
wherein said capsule further includes a cover member for overlaying at least one of said channels, said cover member being affixed to the outer surface of said capsule and forming a gas-tight seal between the region exterior to said capsule and the region interior to said channel.

13. A device according to claim 12 wherein said cover member is fused metal.

14. A device according to claim 12 wherein said cover member is a dielectric element.

15. A device according to claim 12 wherein said channels are located substantially at stress inflection points of said disc elements.

16. A device according to claim 12 further including a pneumatic coupling means for coupling a reference pressure to the interior of said capsule.

17. A device according to claim 16 wherein said pneumatic coupling means comprises a tubular member overlaying one of said channels and being affixed to the outer surface of said capsule to form a gas-tight seal between the region exterior to said capsule and the region interior to said tubular member, whereby said region interior to said tubular member adjoins the interior region of said capsule.

18. A device according to claim 17 wherein said channels are located substantially at stress inflection points of said disc elements.

19. A device according to claim 16 wherein said pneumatic coupling means comprises a tubular member fused to said capsule at said peripheral boundary whereby the interior region of said capsule adjoins the interior region of said tubular member, said tubular member and said capsule forming a monolithic structure.

20. A device according to claim 12 further comprising a mechanical temperature compensator having a bimetallic compensating means for applying temperature dependent forces to the outer surfaces of said capsule, wherein the temperature dependency of said forces substantially matches the temperature dependency of the distance between said opposed inner surfaces over a predetermined temperature range, whereby said distance is substantially a single-valued function of said difference in pressure over said predetermined temperature range.

21. A pressure sensing device comprising:
A. three dielectric disc elements, each having at least one nominally planar surface peripherally bounded by a predetermined curve, said disc elements being fused together at their peripheral boundary to form a monolithic capsule having a first and second interior chamber, wherein said first chamber is bounded by a first and second of said disc elements, and said second chamber is bounded by said second and the third of said disc elements, said first chamber having nominally planar opposed inner surfaces, said opposed inner surfaces being mutually separated by a uniform predetermined gap near said peripheral boundary and by a distance related to the difference in pressure in said two chambers otherwise, and wherein said first chamber includes inner conductive film members disposed on opposed portions of said opposed inner surfaces,
B. electrical coupling means for electrically coupling said inner film members to conductive terminal elements exterior to said capsule, and
C. a medium coupling means for coupling an external medium to said second chamber whereby said external medium is isolated from said electrical coupling means.

22. A device according to claim 21 wherein said medium coupling means comprises a tubular member fused to said third disc element whereby the interior region of said second chamber adjoins the interior region of said tubular member, said tubular member and said capsule forming a monolithic structure.

23. A device according to claim 21 wherein said second disc element is relatively thin compared to said first and third disc elements.

24. A device according to claim 21 wherein said capsule includes a first and second channel passing through said first disc element,
wherein said inner conductive film member on said first disc element extends continuously therefrom to the inner surface of said first channel and to a portion of the outer surface of said capsule, and is in good electrical contact with one of said terminal elements, wherein the inner surfaces of said first chamber further include a coupling film member on a portion of said first disc element opposing a portion of said inner conductive film member on said second disc element, said coupling film member extending continuously from the inner surface of said first chamber to the inner surface of said second channel and to a portion of the outer surface of said capsule, and being in good electrical contact with the other of said terminal elements, and wherein said capsule further includes a cover member for overlaying at least one of said channels, said cover member being affixed to the outer surface of said capsule and forming a gas-tight seal between the region exterior to said capsule and the region interior to said channel.

25. A device according to claim 24 wherein said opposed portions of said inner conductive films are located on central portions of said opposed inner surfaces, and said opposed portions of said coupling film member and said inner conductive film member on said second disc element are located on portions of said opposed inner surfaces near the periphery of said opposed inner surfaces.

26. A device according to claim 24 wherein said cover member is fused metal.

27. A device according to claim 24 wherein said cover member is a dielectric element.

28. A device according to claim 24 further including a pneumatic coupling means for coupling a reference pressure to the interior of said first chamber.

29. A device according to claim 28 wherein said pneumatic coupling means comprises a tubular member overlaying one of said channels and being affixed to the outer surface of said capsule to form a gas-tight seal between the region exterior to said capsule and the region interior to said tubular member, whereby said region interior to said tubular member adjoins the interior region of said first chamber.

30. A device according to claim 21 wherein the outer surface of said capsule includes a first outer conductive film member located on a portion of said first disc element opposite a portion of the inner conductive film member on said first disc element, said first outer conductive film member being in good electrical contact with one of said terminal elements, and wherein the inner surfaces of said first chamber further include a coupling film member on a portion of said first disc element opposing a portion of said inner conductive film member on said second disc element, and wherein further the outer surface of said capsule includes a second outer conductive film member located on a portion of said first disc element opposite a portion of said coupling film member, said second outer conductive film member being in good electrical contact with the other of said terminal elements.

31. A device according to claim 30 further including a pneumatic coupling means for coupling a reference pressure to the interior of said first chamber.

32. A device according to claim 31 wherein said pneumatic coupling means comprises a tubular member fused to one of said disc elements whereby the interior region of said first chamber adjoins the interior region of said tubular member.

33. A device according to claim 32 wherein said tubular member and said capsule form a monolithic structure.

* * * * *

UNITED STATES PATENT AND TRADEMARK OFFICE
CERTIFICATE OF CORRECTION

PATENT NO. : 4,084,438
DATED : April 18, 1978
INVENTOR(S) : Shih-Ying Lee and Dennis K. Briefer It is certified that error appears in the above-identified patent and that said Letters Patent are hereby corrected as shown below:

Column 1, line 60: "head" should read --bead--;

Column 2, line 37: "under" should read --inner--;

Column 10, line 61: "4" should read --1--.

Signed and Sealed this

Nineteenth Day of June 1979

[SEAL]

Attest:

RUTH C. MASON
Attesting Officer

DONALD W. BANNER
Commissioner of Patents and Trademarks